UNITED STATES PATENT OFFICE.

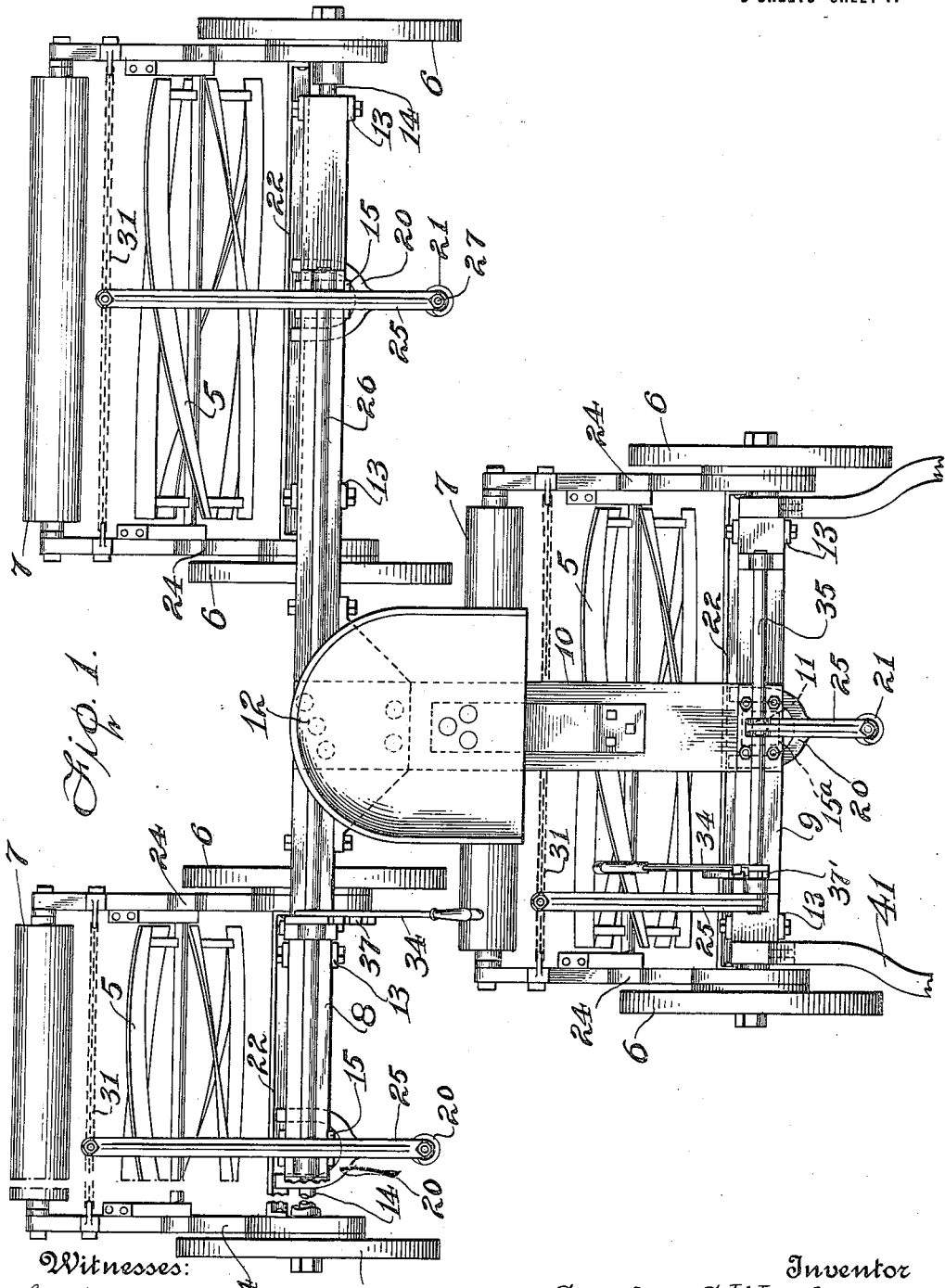

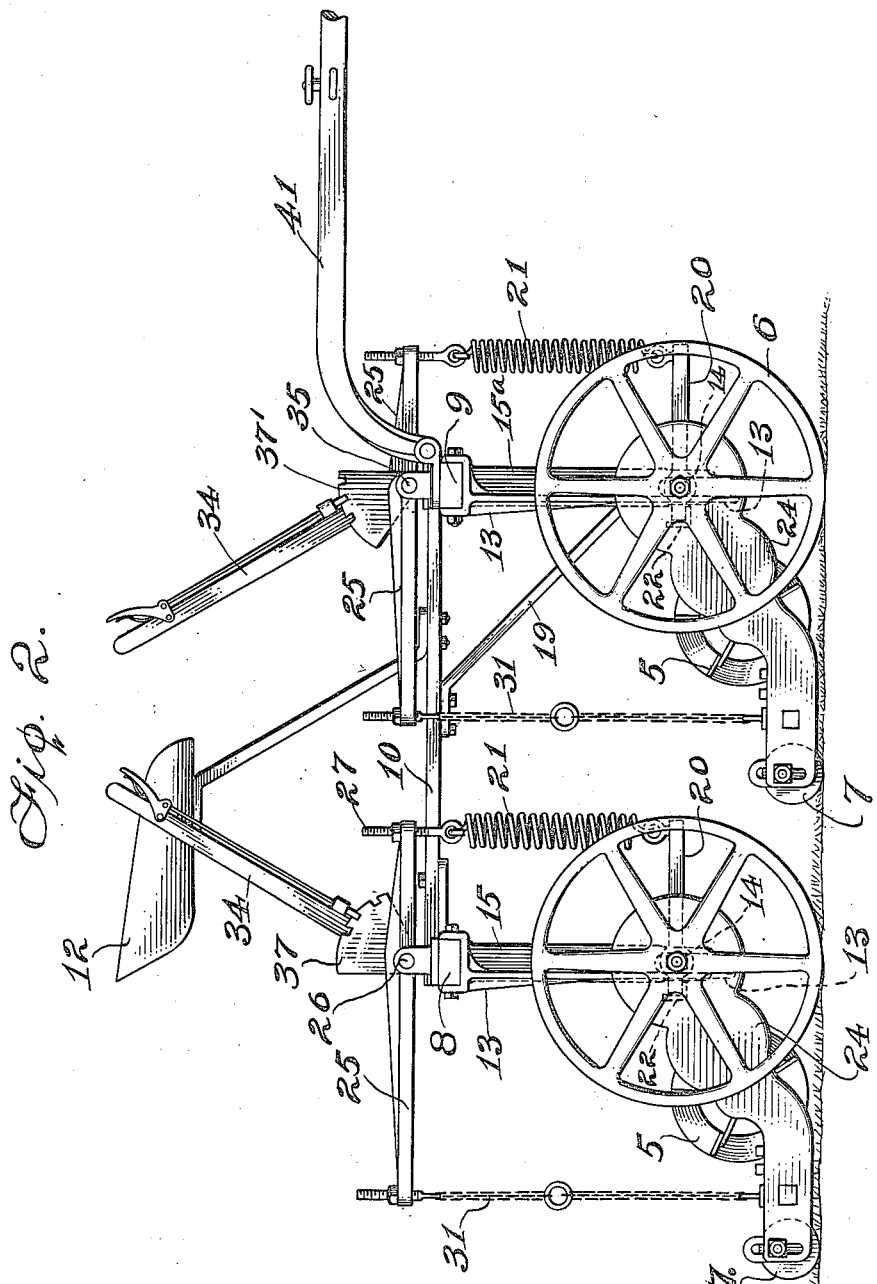

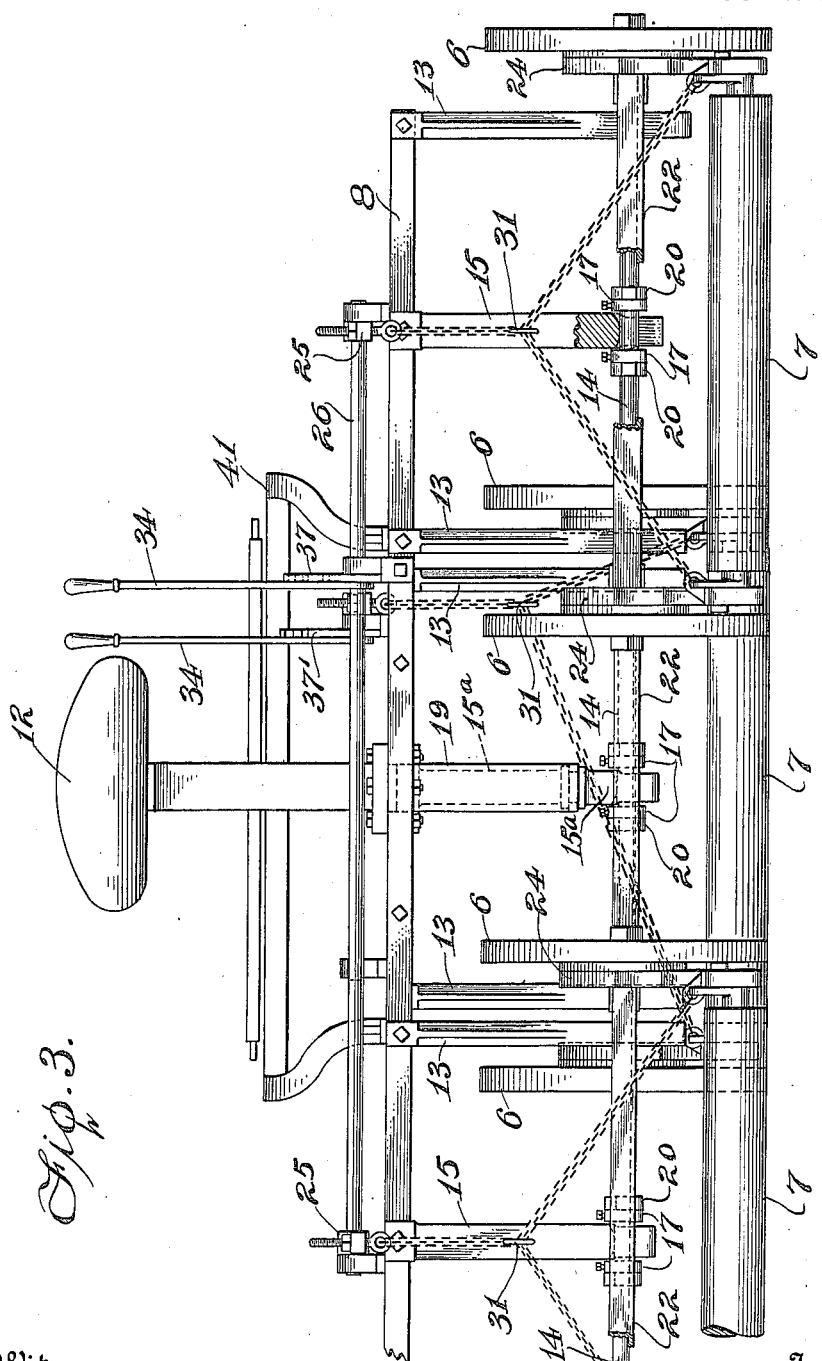

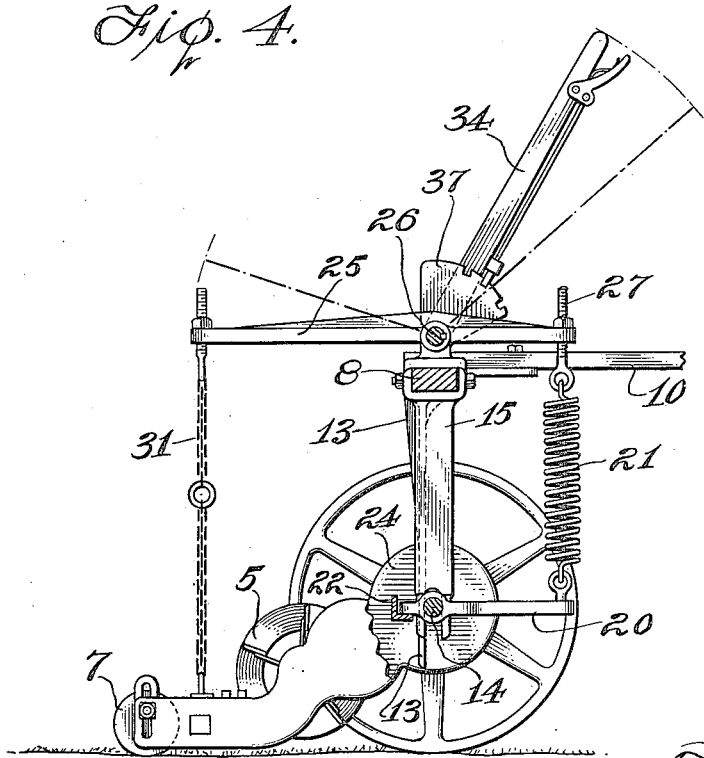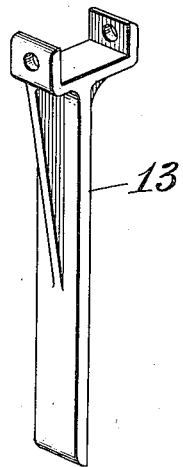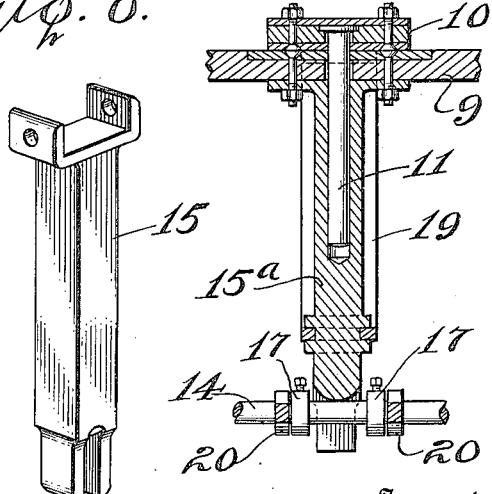

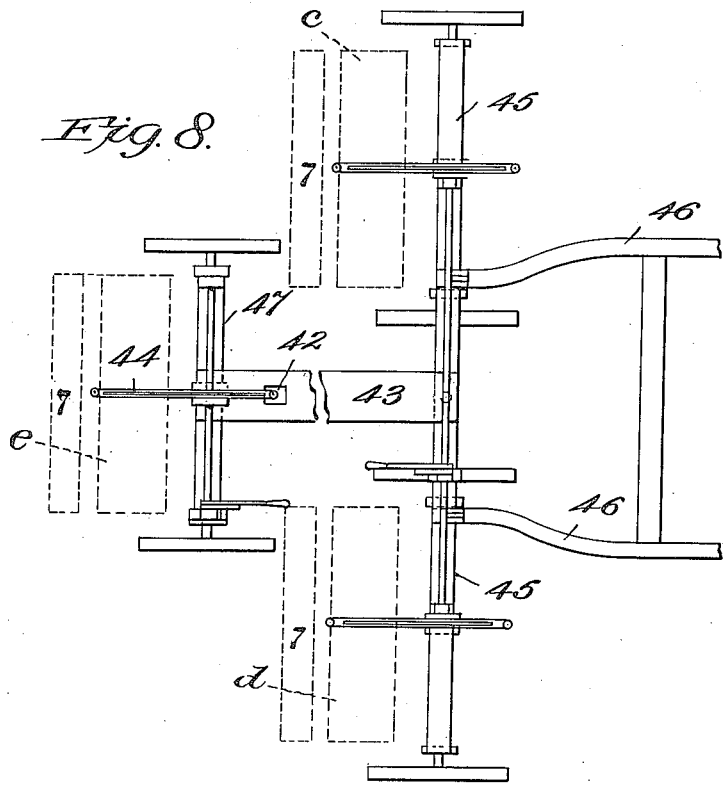
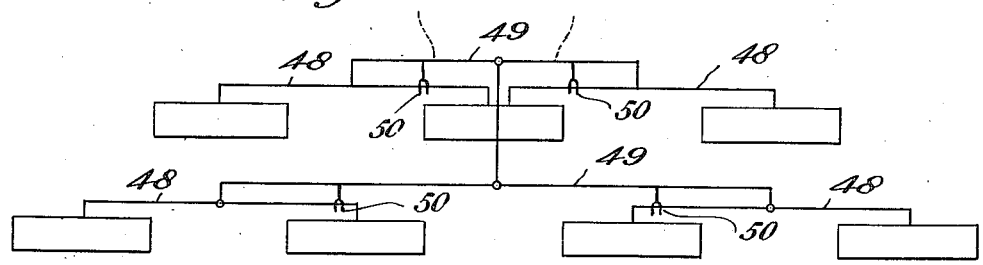
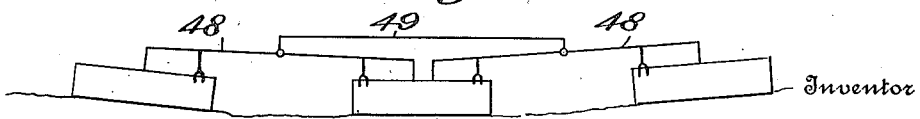

CHARLES C. WORTHINGTON, OF DUNFIELD, NEW JERSEY.

GANG LAWN-MOWER.

1,210,879.  Specification of Letters Patent.  Patented Jan. 2, 1917.

Application filed November 26, 1913. Serial No. 803,296.

*To all whom it may concern:*

Be it known that I, CHARLES C. WORTHINGTON, a citizen of the United States, residing at Dunfield, in the county of Warren and State of New Jersey, have invented new and useful Improvements in Gang Lawn-Mowers, of which the following is a specification.

The invention's object is to provide a gang lawn-mower which is practical in operation, and more especially to provide a mowing machine which, while cutting a wide swath, is of easy draft and perfectly self-accommodating to irregularities of ground surface and without tendency to cut or injure the turf.

The invention also attains other objects having to do with the establishment and maintenance of a proper cutting relation of the knife mechanism to the ground, the adjustment of the same to gage the closeness of the cut, or to remove the said mechanism entirely from cutting relation, and also other objects which will be hereinafter made apparent.

The invention resides especially in the organization of the framework and the several mower units, which it spaces and unites, so that the weight of said frame and any other weight thereon, such as that of the operator or driver, is always distributed equally on all the ground wheels no matter what angle any pair of wheels may assume with reference to the others, when turning corners or when passing irregularities of ground surface, or both, the advantage of this part of the invention being that under no possible condition of use of the machine, can the distribution of the weight be disturbed so as to cause any wheel to cut the turf from being overloaded.

In the accompanying drawings, Figure 1 is a top plan of one form of the invention, with a portion broken away for convenience. Fig. 2 is a side elevation. Fig. 3 is a rear elevation. Fig. 4 is a broken section view taken transversely of one of the rear mowers. Figs. 5, 6 and 7, are details later explained; and Figs. 8, 9 and 10 are diagrammatic representations of modified and developed forms.

The machine comprises a gang of three or more mower units arranged *en echelon*, so that the swaths cut by each will meet or slightly overlap, thereby giving an aggregate width of swath approximately equal to the sum of those of all the units. When the gang consists of three mower units as in Figs. 1 to 4, two are placed side by side, constituting the rear row, and the other is placed centrally in front of them, constituting the front row, but the principle of the invention will be observed to apply also to the reverse arrangement as shown in Fig. 8, where the two units are in front and the third in rear. The mower units themselves may be understood to be standard lawn mowers familiar to the art; the detail of their mechanical construction is of no consequence to this invention. They comprise in general a rotary knife or cutter mechanism, marked 5, which is rotated at high velocity by means of concealed gearing connected to one or both of the ground wheels 6, also termed driving wheels. The space between the two ground wheels is spanned by a rod 14, herein and commonly termed the axle, inasmuch as it coincides with the axes of the said wheels, but the said rod is non-rotary and constitutes part of the framework of the mower unit, rigidly attached to the two side plates or gear-housings 24 at each side. The wiper roller 7, is journaled in the ends of these side plates, immediately in rear of the rotary cutter, and said roller with the two ground wheels constitute the means by which the mower unit normally rests upon the ground.

The gang of mower units arranged as above explained constitutes the sole support for the framework which unites and maintains them in their prescribed arrangement and of course also supports the driver and whatever other devices may be placed upon it. The framework in Figs. 1 to 4 is composed of a wooden cross-piece or beam 8, disposed directly over and parallel with the axles of the two rear units, a reach-piece 10, bolted and braced to the center of the cross piece 8, and a forward cross-piece 9 disposed directly over the axle of the front mower and connected to the reach-piece by a vertical king-pin 11 constituting a fifth-wheel construction shown in Fig. 7. Said construction comprises two usual face plates secured by countersunk bolts to the top and bottom surfaces respectively of the crosspiece 9 and reach-piece 10. The reach and cross-pieces are supported on the three mower units by means of three forked posts 15, 15ᵃ, one of which is separately shown in Fig. 6. Two of such posts are rigidly secured to the rear cross-piece 8, and are fitted by their crotched ends upon the central points of the axles, 14, of each of the rear units. The other post 15ᵃ is similarly secured to the front cross-piece 9, being appropriately bored to receive the end of the king-bolt 11 thereof, and is similarly fitted, by its crotch, to the center of the front mower axle. The connection or engagement of each bearing post with its axle is in the nature of a pivotal joint having a horizontal axis, which thus permits the mowers to assume different angles with respect to the horizontal as they travel over irregular ground, and the said pivotal connection is maintained at the center of the mower axle by means of two collars 17 set-screwed thereon at each side of the crotch. As shown in Fig. 7, the interior of the crotch of the post 15 is rounded, forming in effect a rolling or rocker-bearing. In order to prevent twisting strains in these bearing posts and preserve the mowers true with the frame, the latter is provided with a pair of driving posts 13 for each mower, which posts are rigidly bolted to the frame, one on each side of the bearing posts 15 and 15ᵃ, and extend downwardly at each side to a point below the lowest possible position of the tilting axle, at the rear side of the said axle, and close to the ground wheels thereof. One of these posts is separately shown in Fig. 5; the flat sides are faced forwardly for engagement by the rear sides of the axle and constitute sliding connections resisting backward thrust of the mowers regardless of what vertical angles they may assume. Undue strain on the king-bolt 11 or fifth-wheel construction is prevented by an oblique brace 19 extending from the under side of the reach piece to the lower end of the forward bearing post 15ᵃ at which point the said brace fits the post by a crotch bearing or in any suitable manner not hindering the turning of the post therein as it turns with the cross-piece 9. A driver's seat 12 is mounted on the reach piece 10, and a horse may be hitched to the machine by the shafts 41 attached to the cross-piece of the front or main mower, although other traction means may of course be used.

It will be apparent that as the superimposed frame is supported at three points in fixed relation to each other, each mower must always bear a fixed proportion of the weight and also, since each bearing point is at the mid-point of a mower, each ground wheel of each mower bears a substantially constant proportion of the weight. The construction of the frame and the location of the operator's seat thereon are so arranged that a substantially equal portion of the total weight falls on each point of support, that is to say, on each mower, and hence an equal amount falls on each wheel of each mower, so that equal traction is provided for all the wheels under all conditions of use and all conditions of ground surface. This non-varying distribution of the weight on the several ground-wheels safeguards the machine from injuring the turf, because it avoids the possibility of temporary overload on any one wheel which might cause it to cut a rut, and for the same reason it eliminates the necessity of making the wheel treads wider than necessary for traction purposes, to avoid the consequences of overload, and thereby it minimizes the rolling down action the said wheels have on the grass to be cut. While it is plainly preferable for these and other reasons to construct the machine, as stated, with the points of support in a fixed relationship, and to dispose each such point so as to equalize the weight it transmits to its two ground wheels, under all conditions, it is nevertheless to be observed that variant arrangements approximating such exact proportioning will manifestly also utilize the essential principles thereof, and except as distinctly specified in the claims, there is no limitation herein to the precise arrangement of parts described.

The pivotal connections between the superposed frame and its several mower units are desirably formed at the level of the axles, as, for example, by the engagement of the crotches with the top surfaces thereof, because the equalization of weight on the ground wheels is thereby most effectually preserved and throughout a wider angle of vertical axle-oscillation than if the pivotal point were higher. The level of the said pivotal point may, however be above or below the wheel axis, and may if desired be incorporated in and between portions of the frame structure, so long as the individual mower elements are permitted to accommodate themselves to the slope of the ground surface on which they operate. For the same reasons as above explained, the axis of the fifth-wheel joint is desirably, though not necessarily, disposed directly over the center of the axis of the front pair of wheels or units, as in the cases illustrated. Such joint can very obviously also be incorporated at other points in the frame structure without materially sacrificing any of the principal advantages of the invention.

As an incident to the forward action of mower units of this kind, the rear end of the unit has a lifting tendency imparted to it by the driving effect of its ground wheels upon its rotary cutter, which interferes with the uniformity of pressure of the wiper roller upon the grass and frequently causes the unit to kick up so as to skip patches of grass intended to be cut,—a difficulty which is aggravated by heavy grass or a rapid advancing motion of the machine, and which is not adequately removed by increasing within a practical limit the weight of the units themselves. According to the present invention, however, this tendency and its consequences are effectually prevented by the application of spring or yielding pressure exerted upon the unit. Such pressure is applied by means of a lever 20, rigidly attached to the frame-work of the unit and extended forwardly beyond the wheel axis to a point of connection with one end of a spring 21. As indicated in Fig. 1, the lever 20 is disposed at the center of the unit and forked to accommodate the bearing post 15 thereof, the forked members being formed to clasp the axle 14 and seat by their rear ends upon an angle-iron cross-bar 22, securely fastened at its ends to the gear housings 24. By this means of attachment upward pull on the forward end of the lever 20 results in downward pressure upon the rear part of the unit, as will be evident, thus supplementing the gravity of the unit by the amount of additional force applied to the end of the lever and thereby effectively overcoming the tendency to kick up without increasing the weight to be drawn about by the horse. The upper ends of the springs 21 of the two rear or trailer lawn mowers are connected by threaded eye-bolts 27, to the forward ends of levers 25, both mounted on a rock-shaft 26, journaled on the upper side of the rear cross-piece and operated by the hand-lever 34, which lever is situated at one end of the rock-shaft where it is at the side of the operator's seat. Adjustment of the eye-bolts 27 serves to establish any desired normal pressure of the wiper rollers upon the ground, and adjustment of the hand lever 34 serves to increase that pressure to such extent as circumstances may require. The rear arms of the levers 25 are connected by means of adjustable eye-bolts and the chains 31, to the rear part of the mower units, and serve to lift the wiper rollers from the ground whenever the hand lever 34 is moved to a sufficient extent in the direction to release or diminish the pull of the spring 21. By means of a notched quadrant 37 coöperating with the latch on the hand lever 34, the cutting mechanism of the units may be set at different elevations, thereby enabling the operator to gage the height or length of the cut, making it either long or short, as desired, or the units may be set and held entirely above the range of cutting action to permit the machine to be drawn from one field of operation to another without cutting. The units are thus raised and held raised by the positive action of the chains and lever connections, but are pressed downwardly by the resilient action of the spring, which is desirably under tension whenever the units are cutting grass. The forward mower unit is equipped with a similar spring and raising means, identified by the same references, but the rock shaft, marked 35, is individual to that unit and the forward and rear arms of the lever 25 are offset so that the chains connected to the latter will be disposed at one side of the reach-piece 10 in order to accommodate the turning of the front mower on its fifth wheel joint. The hand-lever 34 on the rock-shaft 35 is likewise supplied with a latch and notched quadrant 37' as in the case of the rear mowers and for the same purposes, and it is mounted on the same side of the operator's seat, but sufficiently spaced from the other lever to avoid interference in any position.

In the modified form of Fig. 8 the construction and organization of the machine is generally the same as that already described, excepting that the front cross-piece 45 of the frame is supported on two mower elements c and d constituting the front row, and the rear cross-piece 47 is carried by a single mower element e constituting the rear row, and the reach-piece 43 is connected by the king pin with the middle of the front cross-piece, to which the shafts 46 are also connected. In this form, an aperture 42 is provided in the reach-piece to accommodate the connection between the spring (not shown) of the rear mower to the lever 44, which controls the pressure thereof, and which serves to lift the rear cutter from the ground.

Although the invention as shown in Figs. 1 to 8, and as above particularly described, is comprised of but three mower elements in the gang, it is to be understood that the principle of the invention extends to more than three units if a larger number is desired. It will be apparent that if more draft power is available the cross-pieces 8 and 9 of the machine shown in Figs. 1 to 3, or the cross-pieces 45 and 47 of that shown in Fig. 8 may be extended so that the desired number of mowers may be attached to them. With such arrangement, it will only be necessary to arrange the individual mower elements with reference to each other, so that those in the lead will break, joint, or be arranged en echelon with respect to those in the rear, so that those in the rear will cut that portion of the swath not cut by those in the lead. Such modification is shown in diagrammatic form in Figs. 9 and 10, wherein it will be observed that the number of mowers in one row is always in excess by one of the number of cutters in the other row, and that the distribution of the weight of the main frame is equal upon the central points of the axles of the various mowers, this effect being retained by yoking the mowers together in pairs as indicated by 48—48, and yoking the central points of the yoke-strips together as indicated at 49—49. The points of connection between the various yoke-strips 49 and 48 are hinged so as to permit vertical rocking motion to the members 48, and in order to prevent undue strain upon the pivotal connections the main frame carries crotched posts 50 connecting and bracing the yoke-piece 48 analogously to the driving posts 13, already described. In other respects, the mower member elements are connected with their respective yoke pieces 48 in the same manner and by like connections as the mowers of Figs. 1 to 4 are connected to their respective cross-pieces 8 and 9.

Having thus described the invention, what is claimed as new is:

1. In a gang mower, the combination of a frame, a plurality of mower elements on which the entire weight of said frame is supported, said elements being arranged in rows, and means connecting the mower elements to the frame whereby independent vertical angular movement on the part of each mower element is permitted without altering the amount of the weight of said frame that is imposed on each mower element or changing the location of the point on which it rests.

2. A lawn mowing machine consisting of a plurality of individual mower units, each unit having an axle, said axles being so held centrally by a superimposed frame, that they are all free to oscillate in their respective vertical planes but are held rigidly to said planes.

3. In a gang lawn mowing machine, a plurality of individual mower members, each member having two independently moving wheels connected by an axle, and a superimposed frame whose weight is supported upon said axles by supports located about midway between each pair of said wheels.

4. In a lawn mower comprising a plurality of cutter units having independent vertical angular movements, a frame carried wholly upon said units by supports so located upon the axles of said units that the said vertical movements do not vary the proportionate amount of the weight of said frame carried by each individual unit.

5. In a lawn mowing machine, a plurality of mower units each having two wheels, a frame supported upon said wheels, and means whereby the weight of said frame is distributed in substantially continuous and unvarying proportion over each of said wheels.

6. In a mowing machine of the kind described, a plurality of rotary cutters, a superimposed frame, driving posts rigidly connected to said frame and slidingly engaging the cutters and arranged to resist the backward thrust of the cutters.

7. In a mowing machine of the kind described, a plurality of rotary cutters, a superimposed frame, driving posts rigidly connected to said frame and slidingly connected to the cutters, and arranged to resist any backward thrust of the cutters, and to permit a vertical rocking motion of said members.

8. In a mowing machine comprising driving wheels, a rotary cutter and a rolling member upon which the weight of said cutter is partially supported, means for exerting a spring pressure upon the point of contact of the said rolling member with the ground.

9. In a mowing machine comprising driving wheels, a rotary cutter and a rolling member upon which the weight of said cutter is partially supported, means for exerting a spring pressure upon the point of contact of the said rolling member with the ground, and means whereby the amount of said pressure may be varied.

10. In a lawn mowing machine, a plurality of mower units having rotary cutters, a frame wholly carried upon said units, a lever mounted on said frame, and connections whereby a plurality of said cutters may be simultaneously raised from or lowered toward the ground by said lever.

11. In a lawn mowing machine, a frame, a plurality of mower units connected to said frame, each unit having rotary cutters, a hand lever attached to the frame, and means by which a plurality of said cutters may be simultaneously raised from or lowered toward the ground and locked in various positions by the said lever, positively as regards downward movement and resiliently as regards upward movement of said cutters with respect to the surface of the ground.

12. In a lawn mowing machine, the combination of a frame, a plurality of individual rotary cutters flexibly connected to the frame, means for lowering and elevating the said cutters, means for producing a variable downward pressure upon said cutters, and means whereby the action of elevating the said cutters and of releasing said downward pressure is accomplished simultaneously.

13. In a lawn mowing machine, a frame, a plurality of individual cutters connected to the frame, means for lowering and elevating the said cutters, means for producing a variable downward pressure upon said cutters, and means whereby the action of lowering of said cutters and the application of said downward pressure is accomplished simultaneously.

14. In a lawn mowing machine, a frame, a plurality of individual cutting members flexibly connected to the frame, springs connected to the cutters, levers so arranged as to operate the springs to exert pressure upon said cutters in a downward direction, and means whereby said pressure may be varied.

15. In a lawn mowing machine, a frame, an individual cutting member flexibly connected to the frame, a spring connected to the cutter, lever arms so arranged as to operate the spring to exert pressure upon said cutter in a downward direction, means including a hand lever whereby said pressure may be varied, and means for holding said hand lever in positions at various adjustments.

16. A lawn mowing machine comprising two rows of mower elements with a pivoted connection joining the said rows, said rows being held together by a superimposed frame resting upon the axles of said elements about midway thereof, the said axles being held rigidly by the said frame to their respective vertical planes while free to oscillate in said planes.

17. A gang lawn mower comprising a plurality of mower units, each including ground wheels, and rotary cutter mechanism operated thereby, a frame arranged to carry the operator and supported solely by said mower units, the location of the supporting connections between said frame and units being disposed to distribute substantially equal portions of the weight of said frame to each unit, and the location of said units with respect to the said connections thereof with the frame being disposed to distribute the load thereon in substantially equal portions to their ground wheels.

18. A lawn mower comprising a gang of mower units providing three pivotal supporting points having a fixed relation each to the other and each including ground wheels and a rotary cutter, a frame uniting said units and carried thereby on said three pivotal supporting points.

19. A gang lawn mower comprising a frame adapted to carry the operator and provided with a fifth-wheel joint, a gang of mower units comprising ground wheels with rotary cutters operated thereby, and supporting means for said frame disposed upon said units to maintain substantially constant portions of the weight of said frame on each of said ground wheels independently of the angle of the said fifth-wheel joint.

20. A gang lawn mower comprising a frame formed to support the operator and including a fifth-wheel joint, a gang of mower units on which the entire weight of said frame is borne, said units including supporting ground wheels and rotary cutter mechanism operated thereby in combination with means forming the connection of said units to the frame adapted to permit vertical movement of said ground wheels to accommodate undulating ground surface.

21. A gang lawn mower comprising a gang of mower units disposed in front and rear positions and each including a pair of ground wheels and rotary cutter mechanism operated thereby, a frame supported on said units to maintain them in said positions and provided with a fifth-wheel joint between the front and rear units, the supporting connections between the frame and units having pivot bearings disposed between the planes of the ground wheels of the units, whereby the latter may conform to undulating ground surface.

22. A gang lawn mower comprising a gang of mower units, a frame adapted to carry the operator and supported wholly on said units by means permitting accommodation of said mowers to irregular or undulating ground surface, and lever means on said frame and connections therefrom to said units whereby the cutting mechanism thereof may be raised from the ground.

23. A gang lawn mower, comprising in combination a gang of mower units each including ground wheels and rotary cutting mechanism operated thereby, a frame carried on said units, the supporting connections therebetween being so disposed between the planes of the ground wheels of said units that the latter may follow undulating ground surface, and means on the frame for raising the cutting mechanism of one or more of the said units from the ground.

24. In a gang lawn mower, the combination of a plurality of mower units each having two ground wheels and an axle coinciding with the common axis of said wheels, and a frame resting on said axle and forming therewith a pivotal joint about midway between the ground wheels.

25. In a gang lawn mower, the combination of a plurality of mower units each having two ground wheels, and a frame uniting said units and having pivotal connection therewith, said connection substantially coinciding with the common axis of the ground wheels of said units and substantially at the center of such axis.

26. In a gang lawn mower, a plurality of mower units comprising driving wheels and rotary cutter mechanism operated thereby, and a frame carried by said units on three pivotal supporting points and provided with a fifth-wheel joint in vertical alinement with one of said points.

27. In a gang lawn mower, a plurality of mower units, having ground wheels and rotary cutters, a frame having bearing connections thereto adapted to distribute substantially constant portions of the weight of said frame to each unit, said connections adapting the units to follow undulating ground surface and so disposed on said units as to impose a substantially constant load on each ground wheel.

28. In a gang lawn mower, a plurality of mower units each comprising ground wheels and rotary cutters, a frame having pivotal bearing connections to said units which exert substantially constant pressure on each unit and adapt the same to operate on undulating ground surface, means on said frame for confining the pivotal movement of said units to their respective vertical planes, and means on the frame for raising the rotary cutters of said units from the ground.

29. A gang lawn mower comprising in combination a gang of mower units each including ground wheels and rotary cutting mechanism, a frame uniting and spacing the units in definite arrangement and carried thereby, and means on said frame for determining the height of cut effected by said cutting mechanism.

30. A gang lawn mower comprising three mower units, each having ground wheels and rotary cutters, a frame supported on said units by means of a single pivotal connection to each unit, and an operator's seat on said frame disposed vertically within the triangle formed by the said connections.

31. In a gang lawn mower the combination of a plurality of mower units, each having two ground wheels and an axle coinciding with the common axis of said wheels, and a frame resting on said axles and having pivotal joints interposed between said axles and the frame and between the planes of the ground wheels of each of said units.

32. In a gang lawn mower a plurality of units comprising driving wheels and rotary cutter mechanism operated thereby, and a frame carried by said units on three pivotal supporting points and provided with a fifth wheel joint located in the vertical plane of the axle of one of said units.

33. In a gang lawn mower a plurality of mower units comprising driving wheels and rotary cutter mechanism operated thereby, and a frame wholly carried by said units on pivotal supporting points and provided with means for permitting one of said units to assume a different horizontal angle from the others.

34. In a gang lawn mower a plurality of units, a superimposed frame carried thereby, each said unit comprising ground wheels and a wiper roller, a spring normally urging said wiper roller toward the ground, and controlling means for said units adapted for operation in one direction to support the roller against gravity, and in the other direction to increase the spring tension.

35. In a mowing machine a plurality of mowing units, a frame resting upon and flexibly connected to said units, and means whereby one of said units may assume independent and varying horizontal and vertical angles with respect to the others.

36. In a gang lawn mower, a mowing unit, a frame flexibly connected thereto and means connected to said frame and unit for exerting downward yielding pressure upon the cutting mechanism of the latter.

37. A main lawn mower, an oscillatorily mounted frame rearward thereof connected therewith, a cross beam on said frame, and trailer lawn mowers carried by said beam, the frames of said trailer lawn mowers being pivotally connected with said beam independent of each other.

38. A main lawn mower, a frame rearward thereof connected therewith, a cross beam on said frame, and trailer lawn mowers carried by said beam, the frames of said trailer lawn mowers being pivotally connected with said beam independent of each other and mounted for oscillatory motions, and saddle like members on said beam freely embracing the frames of said trailer lawn mowers for vertically guiding the latter in their oscillatory motions.

39. A gang lawn mower comprising in combination a gang of mower units, each including a ground wheel, a mower unit frame supported on said wheel and vertically movable about the axis thereof toward and from the ground, and rotary cutter mechanism journaled in said mower unit frame and driven by said ground wheel, a main frame uniting and spacing the units in definite front and rear positions and including means whereby the front and rear units may assume different horizontal angles, means on said main frame for sustaining said mower unit frames in elevated positions and means supplementing the weight of the units and exerting downward yielding pressure on the frames thereof and adapted to prevent the cutter mechanism from jumping upwardly when in action.

40. A gang lawn mower comprising in combination a gang of mower units each including a ground wheel, a mower unit frame supported by said wheel and vertically movable with respect thereto, and rotary cutter mechanism journaled in said mower frame, a main frame carried by and spacing said units in front and rear positions and including means whereby the front and rear units may assume different horizontal angles, pivotal means whereby said units may independently assume varying vertical angles to accommodate undulations in the ground surface, means on said main frame for sustaining said unit frames and the cutter mechanisms thereof in elevated positions and means adapted to supplement the weight of said units for yieldingly holding the cutter mechanisms thereof at a predetermined elevation from the ground surface.

41. A gang lawn mower comprising in combination a gang of mower units each including ground wheels and rotary cutting mechanism, a frame uniting and spacing the units in definite arrangement, means on said frame for determining the height of cut effected by said cutting mechanism, lever members applied to said units, and means for exerting pressure upon said members to force said cutting mechanism yieldingly toward the ground.

In testimony whereof I affix my signature in presence of two witnesses.

CHARLES C. WORTHINGTON.

Witnesses:
 WM. BAGGER,
 BENNETT S. JONES.